United States Patent [19]

Liu et al.

[11] Patent Number: 5,222,023
[45] Date of Patent: Jun. 22, 1993

[54] COMPENSATED TRANSITION FOR SPACECRAFT ATTITUDE CONTROL

[75] Inventors: Tung Y. Liu, Union City; Scott W. Tilley, Belmont, both of Calif.

[73] Assignee: Space Systems/Loral, Inc., Palo Alto, Calif.

[21] Appl. No.: 679,655

[22] Filed: Apr. 2, 1991

[51] Int. Cl.$^5$ .............................................. B64G 1/38
[52] U.S. Cl. .................................. 364/434; 364/459; 244/170
[58] Field of Search .............................. 364/459, 434; 244/164–166, 169–172; 318/582

[56] References Cited

U.S. PATENT DOCUMENTS

| | | | |
|---|---|---|---|
| 3,624,367 | 11/1971 | Hamilton | 235/150.2 |
| 3,643,897 | 2/1972 | Johnson, Jr. | 244/1 |
| 3,866,025 | 2/1975 | Cavanagh | 235/150.2 |
| 3,937,423 | 2/1976 | Johansen | 244/3.22 |
| 3,944,172 | 3/1976 | Becker | 244/169 |
| 3,984,071 | 10/1976 | Fleming | 244/169 |
| 3,997,137 | 12/1976 | Phillips | 244/169 |
| 4,023,752 | 5/1977 | Pistiner | 244/169 |
| 4,174,819 | 11/1979 | Bruderle | 244/169 |
| 4,288,051 | 9/1981 | Goschel | 244/164 |
| 4,370,716 | 1/1983 | Amieux | 364/434 |
| 4,386,750 | 6/1983 | Hoffman | 244/169 |
| 4,504,032 | 3/1985 | Phillips et al. | 244/170 |
| 4,521,855 | 6/1985 | Lehner | 364/434 |
| 4,537,375 | 8/1985 | Chan | 244/171 |
| 4,725,024 | 2/1988 | Vorlicek | 244/164 |
| 4,758,957 | 7/1988 | Hubert | 364/434 |
| 4,927,101 | 5/1990 | Blancke | 244/164 |
| 4,931,942 | 6/1990 | Garg | 364/459 |
| 5,098,041 | 3/1992 | Uetrecht | 244/164 |

FOREIGN PATENT DOCUMENTS 0119810 9/1984 European Pat. Off. .

OTHER PUBLICATIONS

Fidelis O. Eke and Estelle M. Eke, "Backup Nutation Damping Strategy For The Galileo Spacecraft", Jun. 21–23, 1989, Proceedings of the 1989 American Control Conference, vol. 3, pp. 2263–2268.

J.S.-C. Yuan, "Deadbeat Nutation Controller for Momentum Bias Stabilized Spacecraft", Jul.–Aug. 1980, Journal Guidance and Control, vol. 3, No. 4, pp. 361–368.

Primary Examiner—Parshotam S. Lall
Assistant Examiner—Michael Zanelli
Attorney, Agent, or Firm—John S. Ferrell; Edward J. Radlo

[57] ABSTRACT

An improved method for transitioning a spacecraft from a thruster (5) controlled, station keeping mode to an operational, on-orbit mode, in which attitude control is maintained using internal momentum wheels (3). The method first utilizes a thruster compensation technique to supplement the conventional transition mode control system. This compensation uses empirical thruster data to derate thruster (5) efficiency for extremely short pulse durations necessarily used in transition mode operation. Secondly, a three step deadbeat thruster (5) sequence is employed in which a first pulse linearizes spacecraft (1) motion prior to orienting and stopping nutation. This linearization provides improved accuracy in computing and shortens the waiting time for subsequent thruster (5) firings.

4 Claims, 5 Drawing Sheets

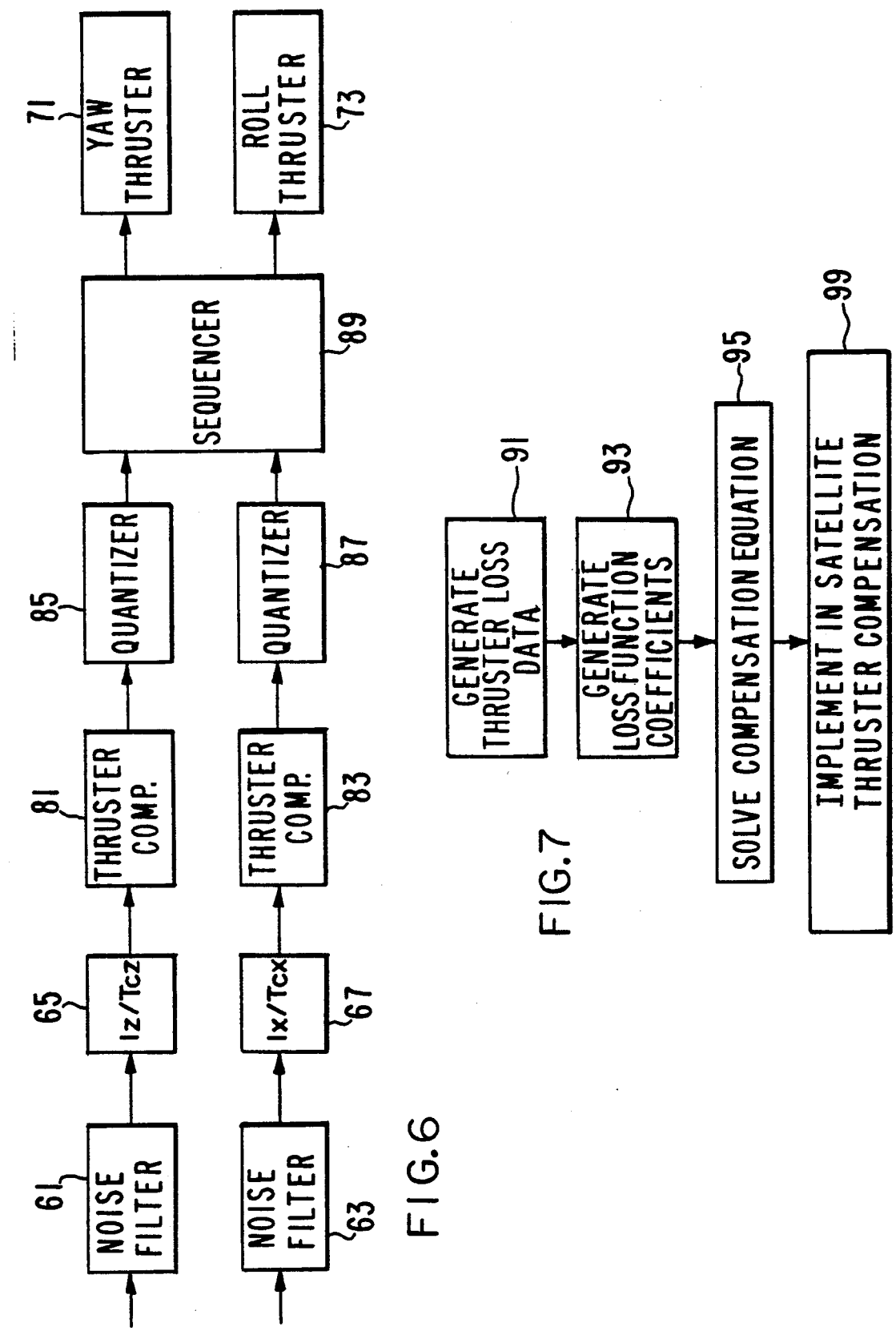

COMPENSATED TRANSITION FOR SPACECRAFT ATTITUDE CONTROL

CROSS REFERENCE RELATED TO APPLICATION

This application incorporates by reference subject matter contained in U.S. Pat. No. 4,931,942 issued to Garg et al. on Jun. 5, 1990.

BACKGROUND OF THE INVENTION

1. Field of the Invention

This invention relates to a method of damping nutational motion in satellites and other spacecraft systems, and more particularly to providing a smooth transition from a station-keeping mode in which the spacecraft is under thruster control to an on-orbit operational status in which control is maintained using momentum wheels to make small orientational corrections.

2. Description of Background Art

The improvements described in this disclosure incorporate by reference the subject matter described in U.S. Pat. No. 4,931,942 issued to Garg et al. on Jun. 5, 1990. The Garg patent describes a method for controlling nutational motion during spacecraft transition from a station-keeping mode to an on-orbit mode using a feedback control system to control multiple thruster pulse firings. Although the problems of thruster non-idealities and orbital dynamic nonlinearities were raised, no solutions were offered beyond convergence to stability through successive feedback controlled thruster pulses.

U.S. Pat. No. 4,288,051 issued to Goschel relates to the stabilizing of a satellite relative to the three major axes prior to the point in time when the satellite is to change orbits, whereupon the engine system for reaching the new orbit is switched on. No separate nutation-damping scheme is disclosed.

U.S. Pat. No. 4,537,375 issued to Chan describes a method of pre-biasing individual thruster motors to compensate for motor offsets and mismatches. The damping of nutational motion is not addressed.

U.S. Pat No. 4,725,024 issued to Vorlicek describes a method for spinning-up a three-axis controlled spacecraft. Nutational motion compensation is not described.

U.S. Pat. No. 4,758,957 issued to Hubert et al. discloses a method for simultaneously processing and nutation-damping a spinning spacecraft that includes thruster firing in response to feedback from angular momentum gyros. This patent has no disclosure of the subject three-pulse thruster firing scheme, nor does it address the topic of thruster compensation.

Other patents uncovered which contain additional information on the general topics of nutation, attenuation, correction in spacecraft systems and the like are as follows:

| U.S. Pat. No. | Inventor |
| --- | --- |
| 3,624,367 | Hamilton, et al. |
| 3,643,897 | Johnson, Jr. |
| 3,866,025 | Cavanagh |
| 3,937,423 | Johansen |
| 3,944,172 | Becker |
| 3,984,071 | Fleming |
| 3,997,137 | Phillips |
| 4,023,752 | Pistiner, et al. |
| 4,174,819 | Bruederle, et al. |
| 4,370,716 | Armieux |
| 4,386,750 | Hoffman |
| 4,521,855 | Lehner, et al. |

SUMMARY

In accordance with the present invention, a method is provided for eliminating nutation in a three-axis stabilized spacecraft (1) employing internal momentum wheels (3) as an attitude stabilizer. Nutation damping is effected using a closed loop control system in which the momentum wheels (3) work in conjunction with spacecraft thrusters (5). This invention discloses two advancements over the prior art. The first advancement is the addition of a thruster compensation mechanism (81,83) to the conventional transition mode control system. The second improvement is the incorporation of a modified deadbeat thruster timing sequence, in which the nutating spacecraft (1) is brought under on-orbit control within three pulses of the thrusters (5).

The thruster compensation mechanism (81,83) comprises a method of correcting thruster (5) inefficiencies which occur in extremely short duration firings, often used in attitude control. During short pulsing periods, fuel is inadequately mixed in the combustion chamber, resulting in power loss. The method consists of equating empirical data on thruster (5) inefficiencies to a polynomial expression and using this polynomial to compensate the error correction coefficients in the solution of the control system equations.

The second advancement presented is the disclosure of a modified thruster (5) sequence for stopping nutation and orienting the spacecraft (1) for on-orbit operation. The prior art teaches that a deadbeat sequence of two pulses is theoretically sufficient for transition from the station-keeping mode to on-orbit operation. In practice, nonlinearities of the dynamic system and non-idealities in the control mechanism require three or more pulsings for complete transition within the requirements of on-orbit operation. Using the three thruster (5) firing technique disclosed below, a first pulse (31) is used to minimize nonlinear spacecraft dynamics and to permit orientation using two additional adjustment pulses (35,39) which act as a deadbeat sequence.

BRIEF DESCRIPTION OF THE DRAWINGS

FIG. 6 is a schematic diagram of the thruster compensation and sequencing section of the nutational damping control system of the present invention; and FIG. 7 is a flow diagram showing the thruster loss compensation algorithm of the present invention.

BEST MODE FOR CARRYING OUT THE INVENTION

Figure 1:
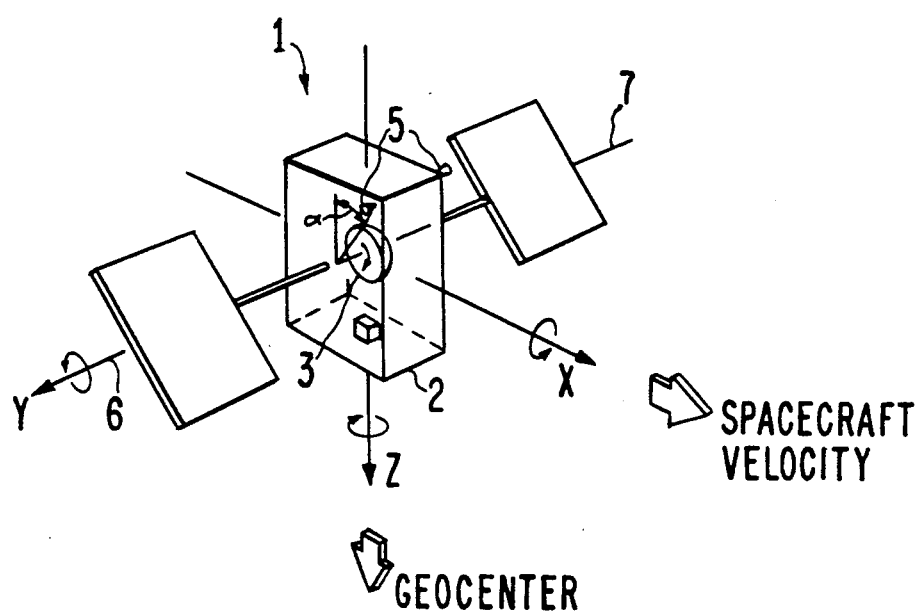
FIG. 1 is a schematic representation of a prior art satellite orbiting in a three-dimensional vector space.

FIG. 1 illustrates a conventional orbiting satellite 1. Under normal on-orbit operation, attitude control is maintained through one or more spinning momentum wheels 3. Each momentum wheel 3 is rigidly attached to frame 2 of the satellite 1 and provides inertial stability, represented by a perpendicular momentum vector 7, which in the example shown in FIG. 1, points along the −Y 7 direction. Small changes in satellite 1 orientation can be effected by changing the speed of one or more momentum wheels 3 and thereby redirecting momentum vector 7.

Periodically, satellite 1 is commanded into a station-keeping mode in order to adjust the orbit or trajectory of operation. This station-keeping mode is implemented using one or more thrusters 5 which fire for a set duration to adjust the orbit of satellite 1. A byproduct of the station-keeping mode is the introduction of various attitudinal perturbations produced by the thruster 5 forces. Among these disturbances is the tendency of satellite 1 to develop a nutational motion about its pitch or Y-axis 6. This nutational motion can be understood by imagining the application of a momentary perpendicular force to the rotational axis of a spinning top or gyroscope. The perpendicular force will cause the top to begin to nutate around the axis of its new momentum vector. The satellite's nutation prevents momentum wheel 3 from controlling the attitude, since the momentum of the nutation greatly exceeds the momentum capability of control wheel 3.

Figure 2:
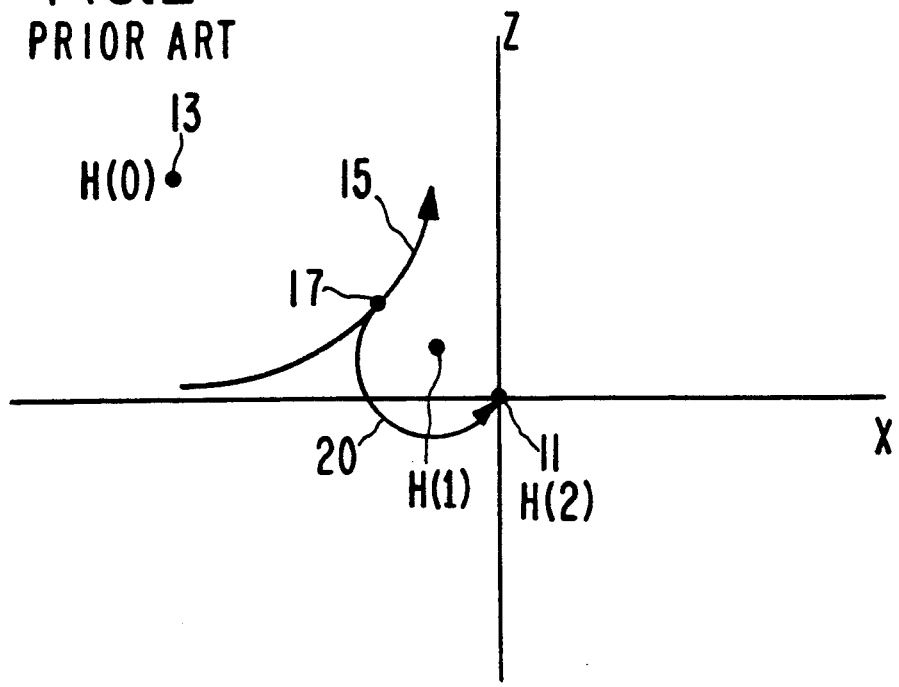
FIG. 2 is a diagram showing the prior art damping of the momentum vector in the X-Z plane by deadbeat impulse firing of a three-axis stabilized satellite.

The goal of the transition mode correction sequence is to utilize short pulses of thruster 5 creating impulses to stop the nutation and to orient momentum vector 7 in a desired direction, such that attitudinal control by momentum wheel 3 can be resumed. FIG. 2 shows a graphical representation of this transition mode, where H(0) represents the initial center 13 of the tip of momentum vector 7 in the X-Z plane nutating along an initial circular nutation path 15. From the example above, this graph can also be thought of as representing the view looking down on the nutating gyroscope along the momentum axis as momentum vector 7 traces the path of nutation. The spacecraft origin 11, formed by the intersection of the X (roll) and Z (yaw) axes including biases if desired, represents the desired momentum vector 7 position which, when achieved, will enable momentum wheel 3 to control spacecraft 1 stability during on-orbit mode operation.

The prior art teaches that in the ideal system, deadbeat nutation damping allows the initial center of momentum 13 to be moved to origin 11 in two pulses of thrusters 5 from any arbitrary initial condition. The first pulse is triggered as the spacecraft 1 nutates to point 17. This first firing creates a nutational trajectory 20 of momentum vector 7 which will cross the origin 11. At the point of intersection of the X and Z axes, thrusters 5 are fired a second time to stop momentum vector 7 at origin 11. At this point, the nutational component is eliminated and momentum vector 7 will be controllable by the momentum wheels 3. U.S. Pat. No. 4,931,942 teaches additional firings near the origin 11 to compensate for non-idealities which may prevent exact intersection with origin 11.

Deadbeat Firing Sequence

Figure 3:
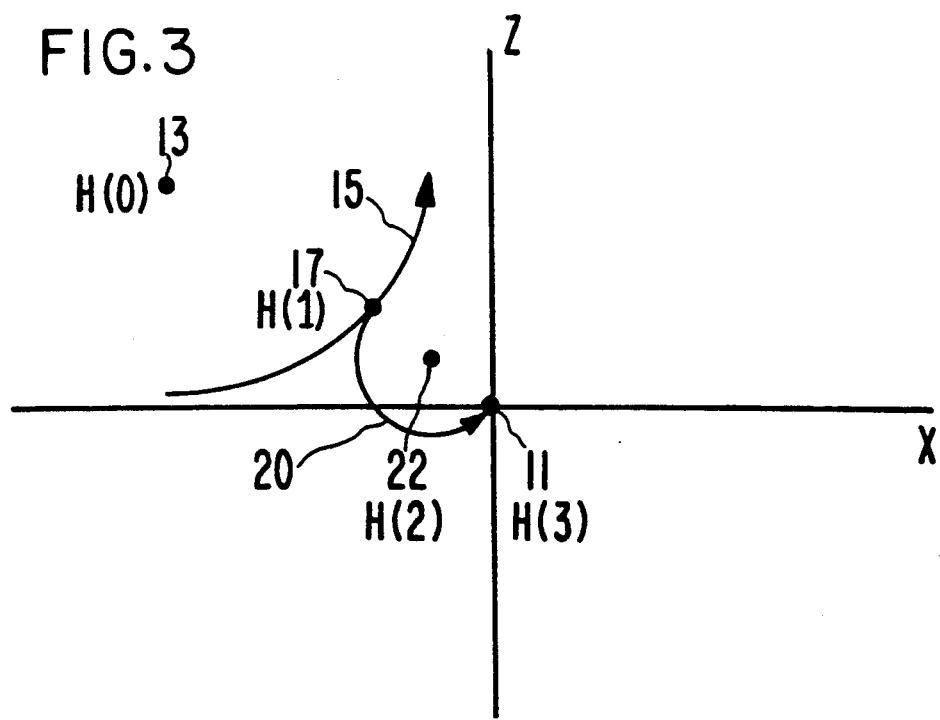
FIG. 3 is a diagram showing the damping of transverse momentum of the present invention by deadbeat impulse firing of a three-axis stabilized spacecraft 1.

The present invention makes use of a compensated thruster 5 control system as well as a modified deadbeat sequence to more accurately and efficiently shift momentum vector 7 from any initial position to origin 11 in three thruster 5 firings. The modified deadbeat sequence is graphically illustrated in FIG. 3. As in the prior art diagram of FIG. 2, spacecraft 1 nutation is represented by a momentum vector 7 tracing an initial nutation path 15 within the X-Z plane about an initial center of momentum 13. After the mode is initiated by ground command, the first pulsing in this modified sequence occurs anywhere on this path after a fixed filter stabilization period in the control logic. At this firing point thrusters 5 are pulsed for the exact duration necessary to eliminate most of the nutation and move the center of momentum from initial center 13 to approximately the first firing point 17. This first pulsing serves two purposes: first, momentum vector 7 is moved closer to the origin; second, the nutation is minimized, linearizing the dynamic system, and thus allowing more accurate calculation of the final deadbeat pulse firings remaining to create the remaining origin-intercept vectors.

Following the first firing, the 2nd pulse width calculation is allowed several seconds to stabilize, before a second firing initiates the nutational trajectory 20. The second firing causes the center of momentum to shift from first firing point 17 to the center of momentum 22 along the nutational trajectory 20, which is designed to intersect origin 11 in one-half of the nutation period. A final third pulse is delivered at the origin 11 to bring the nutation to a halt at a point where momentum wheel 3 control is possible. Additional firings should not be necessary, since dynamic nonlinearities were minimized by the first firing and the finest resolution of sensing and actuating has already been achieved.

Figure 4:
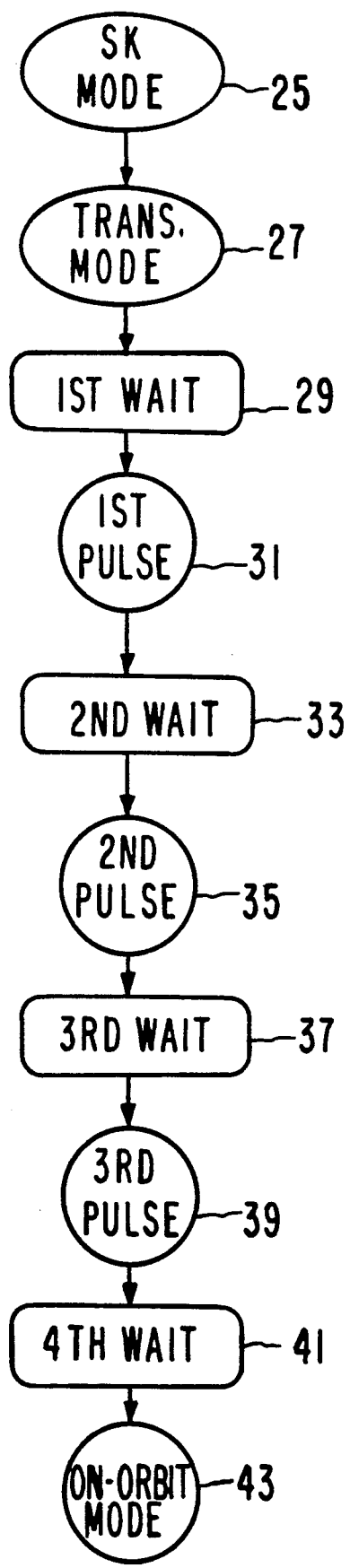
FIG. 4 is a flow diagram showing the modified thruster sequence steps of the present invention.

FIG. 4 shows a time-sequenced flow diagram of the disclosed transition mode. Following the completion of station-keeping mode 25, spacecraft 1 enters a transition mode 27 in which nutational motion is damped in preparation for on-orbit mode 43. The first step of the transition mode is a first wait period 29 in which the calculated pulse widths are allowed to reach a steady state. This first wait 29 nominally takes between 6 and 10 seconds. The first pulse 31 is then fired, transferring nutation path 15 to the first transient nutation path 20. A second wait 33 of 6 to 10 seconds is interjected to allow the calculated pulse widths to stabilize. In a sequence, the second pulse is fired, with more accurate pulse widths calculation, transferring the nutation path to a circular transient nutation path 204. A third wait 37 of one-half of a nutation period is required to allow the nutation path to intercept origin 11, at which time a third pulse 39 is fired, killing the nutational movement and stopping momentum vector 7 at origin 11. A fourth wait 41 of approximately one second is introduced to allow thruster 5 transients to settle. Conversion to an operational on-orbit mode 43 automatically follows the successful damping and spacecraft 1 orientation transition.

Thruster Compensation

Figure 5:
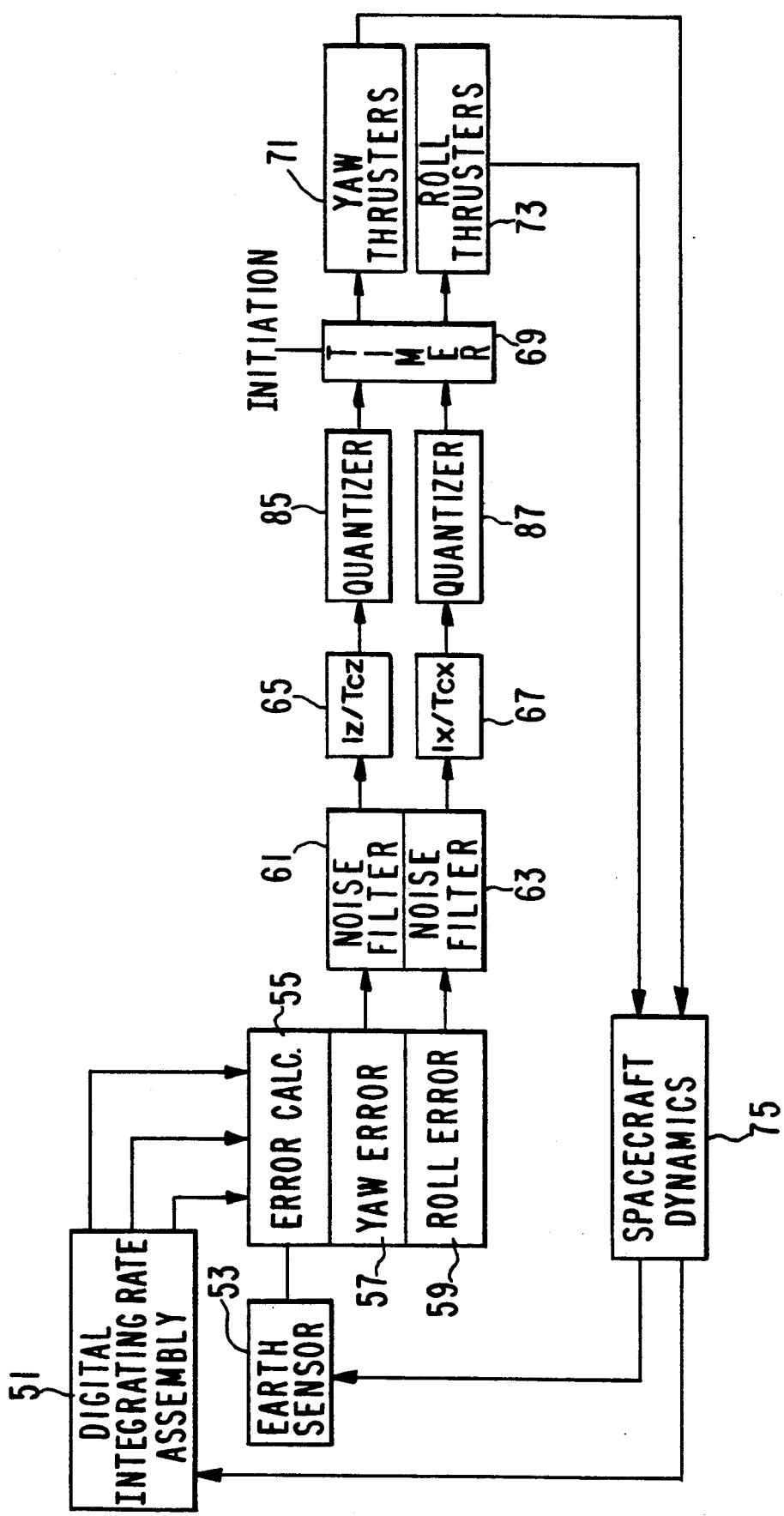
FIG. 5 is a schematic diagram of the prior art nutational damping control system.

FIG. 5 shows the prior art transition control system which also forms the basis for thruster 5 compensation improvement of the present invention. At the completion of the station-keeping maneuver, error calculator 55 receives information relating to roll/yaw rates and yaw position from Digital Integrating Rate Assembly (DIRA) 51 and information relating to spacecraft 1 roll position from earth sensor 53. Error calculator 55 produces a pair of error coefficients which are ultimately used to determine thruster 5 pulse duration times for yaw and roll thrusters 71,73, respectively. Error calculator 55 produces yaw momentum error 57 and roll momentum error 59 and transmits these coefficients into a pair of low pass noise filters 61,63. The outputs of noise filters 61,63 are multiplied by weighting factors 65,67 consisting of inertia components (I) divided by torque components (T). These coefficients are then quantized and advanced to thruster control timer 69 and used to control yaw and roll thrusters 71,73. A feedback network is present by way of spacecraft dynamics 75.

The compensated thruster control system of the present invention is shown in FIG. 6. As in the prior art, error coefficients are filtered in noise filters 61,63. The outputs of noise filters 61, 63 are then applied respectively to inertial and torque weighting factors in blocks 65 and 67. These are applied to thruster compensators 81, 83, wherein empirical information relating to the non-idealities of the averaged thruster's 5 performance is applied to the error coefficients. These coefficients are quantized in blocks 85,87, and these new error coefficients are implemented in a modified timing sequencer 89. This modified timing sequencer calculates and transmits firing durations in yaw and roll thrusters 71, 73, respectively.

Prior to installing thrusters 5 on the spacecraft 1, experimental burn data is collected by operating thrusters 5 over a range of burn durations, while recording thruster 5 impulse as a function of duration. In the preferred embodiment of the present invention data for burn periods of between 0 and 64 msec. is generally collected. This empirical data is used to derive a polynomial approximation of the form where L(EPW)

$$L(EPW) = L_o + \sum_{i=1}^{i=n} L_i * (EPW)^i$$

represents the Loss ($L \leq 1$) or efficiency of the thruster 5 as a function of the electrical pulsewidth in msec.

The positive, non-zero, integer n represents the order of the polynomial function L(EPW). The value of n is chosen large enough to produce a close approximation of the emperical thruster 5 performance. Values between 3 and 6 are typical in the preferred embodiment of the present invention.

As discussed above this Loss function mathematically describes the thruster 5 non-idealities experienced at short firing durations, typically less than 40 msec. The object of the thruster 5 compensation is to generate a corresponding compensation function C which, when multiplied by the Loss equation, L(EPW), cancels the effects of the thruster 5 non-idealities. Such a function C of the Idealized Pulsewidth (IPW) can be found by applying the Loss coefficients $L_1, \ldots L_n$ to solve for a set of corresponding compensation coefficients $C_1, \ldots C_n$ using the relationship:

$$C(IPW) * L(EPW) = 1$$

where $$EPW = C(IPW) * IPW$$

The equation is necessarily recursive since, in the region of non-ideality, the thruster 5 performance improves nonlinearly as pulsewidths increase. The compensation function implemented within the thruster 5 compensation block 81,83 can be expressed by the equation:

$$C(IPW) = C_o + \sum_{i=1}^{i=n} c_i * (IPW)^i;$$

where C(IPW) is in msec. Alternatively, piecewise linear segments can be used to approximate the polynomial in a numerically efficient method. In the preferred embodiment, IPW's of interest range from 2 msec. to 40 msec. Additional logic is provided to fix C at a constant value for IPW's less than 2 msec. and for IPW's greater than 40 msec.

FIG. 7 shows a flow chart for the method used in calculating the compensated thruster 5 coefficients. Block 91 refers to the generation of thruster 5 loss data based on empirical information taken from the individual thruster motors. This empirical data includes thruster 5 impulse as a function of burn time. This thruster 5 loss data is then used to create a derating model from which polynomial loss function coefficients can be generated as shown in step 93. The loss function coefficients are then used to solve a polynomial compensation function in step 95, from which compensation coefficients can be extracted. Alternatively the coefficients can be implemented in spacecraft as a piece-wise linear functions before quantization. The quantization function applied by block 85, 87 is:

$$EPW = INT((EPW-1.0)/2.0)*2.$$

The invention has now been explained with reference to specific embodiments. Other embodiments will be apparent to those of ordinary skill in the art in light of this disclosure. Therefore it is not intended that this invention be limited, except as indicated by the appended claims.

We claim:

1. A method for damping nutation in a spacecraft having a control system comprising thrusters and noise filters, by using a modified deadbeat thruster firing sequence, wherein the method comprises the steps:

firing a first thruster pulse to linearize spacecraft motion;

computing direction and duration of a second thruster pulse firing;

allowing a momentum error to reach steady state through a short wait period having a duration of between six and ten seconds;

firing the second thruster pulse in order to nutate the spacecraft to an origin point of desired on-orbit operation;

waiting one-half of a nutation period as the spacecraft nutates to the origin; and firing a third thruster pulse to stop nutation when the spacecraft reaches the origin.

2. A method for controlling transition from thruster control to momentum wheel control in a spacecraft by compensating for thruster losses in a nutational damping control system, wherein the method comprises the steps:

generating empirical loss data for at least one thruster;

characterizing the thruster loss data by a polynomial equation of the form:

$$L(EPW) = L_o + \sum_{i=1}^{i=m} L_i * (EPW)^i$$

where EPW is the electrical pulsewidth of the thruster, L is the loss coefficient, and n is a positive non-zero integer;

solving extended pulsewidth times from the recursive equation:

$$C(IPW) * L(EPW') = 1$$

where $$EPW' = C(IPW) * IPW$$

and C(IPW) is the compensation function of the idealized pulsewidth (IPW);

quantizing the extended pulsewidth times using the function:

$$EPW' = INT((EPW' + 1.0)/2.0) * 2.0;$$

implementing the quantized extended pulsewidth times in the nutational damping control system; and firing thrusters by application of pulses of duration determined by the nutational damping control system.

3. The method in claim 2, wherein the step for generating empirical thruster loss data comprises the substeps:

operating the thrusters over a range of burn durations; and p1 recording thruster impulse as a function of burn duration.

4. The method of claim 3, wherein the range of burn durations extends from 0 to 64 msec.

* * * * *